Dec. 28, 1965 L. F. COFFIN, JR 3,226,608

LIQUID METAL ELECTRICAL CONNECTION

Filed June 24, 1959

Inventor:
Louis F. Coffin Jr.,
by James J. Lichiello
His Attorney.

3,226,608
LIQUID METAL ELECTRICAL CONNECTION
Louis F. Coffin, Jr., Schenectady, N.Y., assignor to General Electric Company, a corporation of New York
Filed June 24, 1959, Ser. No. 822,571
4 Claims. (Cl. 317—234)

This invention relates to electrical connections incorporating a liquid metal as the joining medium, and more particularly to those electrical connections subjected to stresses and strains cyclic or otherwise and generally requiring flexibility or means to absorb and not to resist the stresses and strains imposed Numerous conditions exist where electrical joints and connections are required between electrically conducting elements and where, because of thermal and other expansion effects, considerable mechanical stresses and strains are imposed upon the joint. In those electrical connections, particularly, where the flow of current through the connection is continuous in nature or where the temperature of the connected parts remain constant, the stress problem is minimized since it may be accommodated or absorbed by plastic deformation either of the joining medium and/or the elements joined alternately. Many mechanical slip type connections are utilized for this purpose. There are situations, however, where current flow may be interrupted with such frequency as to impose a cyclic thermal stress on the connection because of thermal expansion mismatch and the connection fails because of the fatigue of the material. These connections may also require a more positive and certain electrical connection than obtainable with mechanical stress absorbing types or the mechanical type is too bulky or uneconomical.

One particular problem relates to the manufacture of power rectifiers using silicon diodes. In this application, the silicon is in the form of thin wafers or sheets which are generally brazed to thin sheets of a ductile material, for example, molybdenum, tungsten, etc., having a similar thermal expansion coefficient as that of the silicon. The composite structure is then, in turn, soldered, brazed or otherwise joined to a bus-bar of a material, for example, copper. Under cyclic current operations, a wide mismatch in expansion occurs between the copper and molybdenum and failure of the joint between these materials is a common occurrence.

Accordingly, it is an object of this invention to provide a liquid metal electrical connection which will not fail because of mismatch effects.

It is a further object of this invention to provide a stress absorbing metal connection utilizing a metal which is liquid under operating conditions.

It is a further object of this invention to provide a liquid metal electrical connection peculiarly adaptable to electrical connections between dissimilar materials.

It is a further object of this invention to provide a liquid metal electrical connection for semi-conductor devices.

These and other objects of my invention are accomplished by employing for an electrical connection joining medium between two conductors, a metal which is liquid under operating conditions, and to be maintained in the connection by capillary action or molecular adhesion.

This invention will be better understood when taken in connection with the description and the following figures in which.

Figures 1, 2:
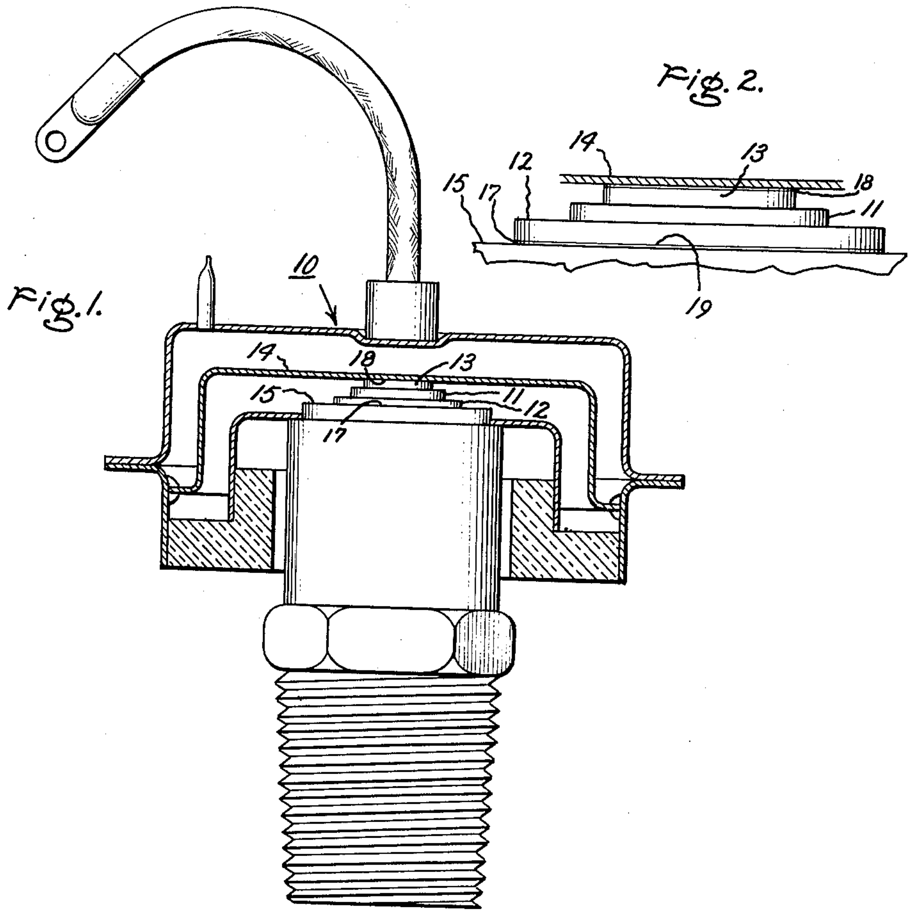
FIG. 1 illustrates a schematic form of a silicon rectifier.
FIG. 2 is an enlarged view of the particular liquid metal connection utilized in FIG. 1.

Referring now to FIG. 1, there is illustrated in schematic form a high current silicon rectifier 10 employed to obtain direct current from an alternating current source. A full description of all the elements of a silicon rectifier is not needed at this time, since these rectifiers are well known in the art and the invention is directed particularly in one form to the joining of the silicon disc 11 to the proper connectors. In rectifier 10, silicon disc or diode 11 is brazed or otherwise joined to a pair of discs or elements 12 and 13, usually of tungsten or molybdenum, etc. Tungsten and molybdenum, for example, are employed primarily for the protection of the silicon disc 11 because the temperature coefficients of tungsten and molybdenum closely approximate that of silicon. Discs 12 and 13 also facilitate the joining of the silicon disc 11 to the rectifier assembly. However, while the joining of the silicon disc 11 to discs 12 and 13 facilitate joining and protect the silicon disc 11 itself, a joining problem arises in the joint between the discs 12 and 13 and the conductors 14 and 15. Numerous instances of failure have been encountered in the soldered or brazed joints at 17 and 18, because of the uneven temperature expansion between the discs 12 and 13 and their conductors 14 and 15. This expansion mismatch is primarily that in a radial direction and the difference in the coefficient of expansion causes failure of the soldered or brazed joint and ultimately failure of the rectifier. While various slip joint connections may be employed in order to obviate the failure, in a high current silicon rectifier, for example, 250 to 500 amperes, such a joint must be capable of sustaining the high current and thus need be a substantial and reliable electrical connection of small size.

A preferred form of this invention is shown in FIG. 2, illustrating the joint 17 between the molybdenum disc 12 and the copper stud or bus-bar connector 15. The joint 17 between the molybdenum disc 12 and copper stud 15 may be considered to be, in a sense, a soldered joint where the soldering material 19 is a metal, such as for example, an alloy of tin and indium which has a low melting point. The molybdenum disc 12 and the copper stud 15 are spaced apart sufficiently to permit the application of the soldering metal between the two discs and the thickness of the metal 19 is kept to a minimum. In operation, therefore, the attainment of operating temperature will cause a melting of the soldering metal and thereby permit uneven radial expansion of the molybdenum and copper together with some vertical expansion without a physical destruction of the joint. The soldering metal 19, however, should be one which is capable of wetting both the molybdenum and the copper in order that a good electrical connection will be established and maintained during all operating conditions. Furthermore, the distance between the molybdenum and copper should be kept to a minimum so that when the soldering metal 19 melts there will be no loss from joint 17 and the soldering metal will be maintained in position by capillary action or molecular adhesion. It is contemplated, however, that additional means or configurations may be employed to maintain metal 19 in position in the molten condition. Further examples of a liquid metal to be employed would be mercury, indium-silver, bismuth-tin, bismuth-indium, Wood's alloy or sodium potassium alloy, etc.

This invention is equally applicable in addition to electrical connections including the silicon rectifier 10 connection as previously described, to spaced apart connectors having such a different rate of thermal expansion that the gap increases in width and the problem of maintaining the joining material in the joint becomes evident. A modification employed to maintain the soldering material within the joint is shown in FIG. 3.

Figure 3:
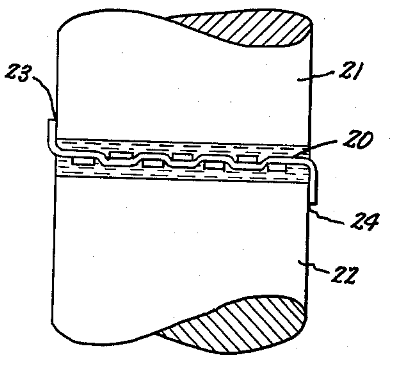
FIG. 3 is a modification of the invention illustrated in FIG. 2.
Figure 4:
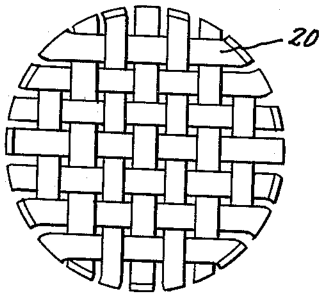
FIG. 4 is an end view of the modification of FIG. 3.

Referring now to FIG. 3, there is illustrated, for example, a molybdenum-copper joint having a liquid metal in accordance with the description of FIGS. 1 and 2. In this modification, a suitable mat or screen element 20 is positioned between two conductors 21 and 22, for example, molybdenum and copper, and is alternately joined to the molybdenum conductor 21 at 23 and to the copper conductor 22 at 24 which is peripherally disposed from 23, preferably 180°. In a preferred form of this invention, the mat or screen element is so chosen that a liquid metal 19 wets the mat 20 in addition to the conductors 21 and 22 and, therefore, metal 19 will be maintained in the joint by the molecular adhesion or capillary action between the mat element 20 and the molybdenum conductor 21 between the mat element 20 and the copper conductor 22 and between the metal 19 and mat element 20. For example, mat or screen 20 may be of copper, molybdenum or stainless steel and the individual strands suitably intertwined or otherwise maintained in engagement. During current passage through this joint and resultant increase in temperature, liquid 19 melts to accommodate any unequal expansion between conductors 21 and 22 in a radial direction. During unequal expansion in the vertical direction, screen 20 maintains a positive connection between conductors 21 and 22 while at the same time maintaining liquid metal 19 in the joint.

As will be apparent to those skilled in the art, the objectives of my invention are attained by the use of a metal joining material which is solid under no current flow or low temperature conditions, and liquid under current flow and/or high temperature conditions to accommodate the expansion of dissimilar metal conductors at their connection, and a preferred form of the invention is applicable to a joint between a first and second conductor having predetermined but different coefficients of expansion. It will be understood, however, that the liquid metal may remain in the liquid form under no current low temperature conditions, for example, when using mercury.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. In a high current rectifier, a fixed, electrical, soldered joint comprising in combination, a pair of spaced apart conductors, a rectifier diode between said conductors, a metal element positioned between said rectifier diode and one of said conductors and spaced from said conductor, said element having a different coefficient of expansion than that of said one conductor, and a solid metal in said space between said element and said conductor, said solid element being characterized by melting on the flow of current between said conductors through said rectifier, the combination of the spaced apart element and conductor and the liquid metal providing a flexible connection for expansion mismatch.

2. A fixed, electrical, soldered joint comprising a pair of spaced apart conductors, one of said conductors having a predetermined coefficient of expansion, the other of said conductors having a different coefficient of expansion, a solid metal in said space between said conductors, said solid metal being characterized by melting on the flow of current between said conductors providing a flexible connection for expansion mismatch, and retaining means between said conductors, said retaining means comprising a metallic screen element attached to said conductors.

3. A fixed, electrical, solder joint comprising a pair of spaced apart conductors, one of said conductors having a predetermined coefficient of expansion, the other of said conductors having a different predetermined coefficient of expansion, and a solid, low melting point metal in said space between said conductors, said solid metal being characterized by being in liquid state during operating-current flow from one of said conductors through said metal to the other of said conductors thereby providing a flexible connection for expansion mismatch.

4. A fixed, electrical, solder joint comprising a first molybdenum conductor, a second copper conductor, said conductor spaced apart, and a low melting point tin-indium alloy in said space between said conductors, said alloy being characterized by being in liquid state during operating-current flow from one of said conductors through said metal to the other of said conductors thereby providing a flexible connection for expansion mismatch.

References Cited by the Examiner

UNITED STATES PATENTS

| | | | |
|---|---|---|---|
| 997,924 | 7/1911 | Leeper | 200—116 |
| 2,603,693 | 7/1952 | Kircher | 317–235 |
| 2,677,033 | 4/1954 | Smith | 200—152 |
| 2,697,052 | 12/1954 | Dacey et al. | 148—1.5 |
| 2,806,187 | 9/1957 | Boyer et al. | 317—234 |
| 2,863,105 | 12/1958 | Ross | 317—234 |

OTHER REFERENCES

Publication, Materials and Methods, September 1952, pp. 113–115, article by R. I. Jaffee et al. (Title: Indium Alloys Finding Important Commercial Uses).

JOHN W. HUCKERT, *Primary Examiner.*

BENNETT G. MILLER, LLOYD McCOLLUM, SAMUEL BERNSTEIN, JAMES D. KALLAM, GEORGE N. WESTBY, DAVID J. GALVIN, *Examiners.*